US008825916B2

(12) United States Patent
Chen

(10) Patent No.: US 8,825,916 B2
(45) Date of Patent: Sep. 2, 2014

(54) METHOD AND DEVICE FOR IDENTIFYING DEVICE PORTS OF DATA CARD IN LINUX SYSTEM

(75) Inventor: Ying Chen, Shenzhen (CN)

(73) Assignee: ZTE Corporation (CN)

(*) Notice: Subject to any disclaimer, the term of this patent is extended or adjusted under 35 U.S.C. 154(b) by 47 days.

(21) Appl. No.: 13/578,210

(22) PCT Filed: Aug. 10, 2010

(86) PCT No.: PCT/CN2010/075824
§ 371 (c)(1),
(2), (4) Date: Aug. 9, 2012

(87) PCT Pub. No.: WO2011/130975
PCT Pub. Date: Oct. 27, 2011

(65) Prior Publication Data
US 2012/0303838 A1 Nov. 29, 2012

(30) Foreign Application Priority Data

Apr. 21, 2010 (CN) .......................... 2010 1 0157987

(51) Int. Cl.
*G06F 3/00* (2006.01)
*G06F 13/10* (2006.01)
*G06F 9/44* (2006.01)
(52) U.S. Cl.
CPC ........ *G06F 13/10* (2013.01); *G06F 2213/0042* (2013.01); *G06F 9/4413* (2013.01)
USPC .................................. 710/12; 710/15; 710/9
(58) Field of Classification Search
CPC ..................... G06F 2213/0042; G05F 2213/40

USPC ......................................................... 710/12
See application file for complete search history.

(56) References Cited

U.S. PATENT DOCUMENTS

| 6,775,728 | B2 * | 8/2004 | Zimmer et al. ............... 710/260 |
| 6,779,059 | B2 | 8/2004 | Han et al. |
| 2003/0205615 | A1 | 11/2003 | Marappan |

(Continued)

FOREIGN PATENT DOCUMENTS

CN         1442794         9/2003

OTHER PUBLICATIONS

International Search Report for International Application No. PCT/CN2010/075824 mailed Jan. 13, 2011.

*Primary Examiner* — Henry Tsai
*Assistant Examiner* — John Roche
(74) *Attorney, Agent, or Firm* — Merchant & Gould P.C.

(57) ABSTRACT

A method and an apparatus for identifying device ports of a data card in a Linux system are provided, the method comprises: acquiring information of a Universal Serial Bus (USB) device; recording device information that is related to the USB device to be identified in said information; acquiring port information of each port of said USB device to be identified according to the device information of the said USB device to be identified; identifying attributes of said ports according to the information of each port. By acquiring the device information and the port information, the Attention (AT) port and the Modem port could be identified correctly according to the feature that the AT port and the Modem port could send and receive AT commands as well as the preset order attribute of the AT port and the Modem port, thus identifying the attributes of each port of the device accurately.

16 Claims, 4 Drawing Sheets

(56) References Cited

U.S. PATENT DOCUMENTS

2005/0066129 A1* 3/2005 Chang et al. .................. 711/115
2005/0246163 A1* 11/2005 Ono et al. .................... 704/200
2006/0015638 A1* 1/2006 Holzhauser et al. .......... 709/232
2008/0176520 A1* 7/2008 Matsuo et al. ............. 455/67.14
2009/0185218 A1* 7/2009 Azami ........................ 358/1.15
2010/0211963 A1* 8/2010 Suwabe ........................ 719/327

* cited by examiner

METHOD AND DEVICE FOR IDENTIFYING DEVICE PORTS OF DATA CARD IN LINUX SYSTEM

This application is a National Stage Application of PCT/CN2010/075824, filed 10 Aug. 2010, which claims benefit of Serial No. 201010157987.X, filed 21 Apr. 2010 in China and which applications are incorporated herein by reference. To the extent appropriate, a claim of priority is made to each of the above disclosed applications.

TECHNICAL FIELD

The present invention relates to the field of data card device identification technologies, and more especially, to a method and apparatus for identifying device ports of a data card in a Linux system.

BACKGROUND OF THE RELATED ART

To make the performance of the wireless data card play maximally, it needs the cooperation of the data card management software at the personal computer (PC) side.

The process of identifying device ports in the Windows system is generally as follows, first, it is to create a device description table for the device, the table must comprise the device's product ID (PID) and the device enumerated port descriptions information, the format of the information must comply with the requirements of the interface description format in the Windows system. The port description information in the table must be accurate and unique in order to ensure that the application program can quickly and accurately judge whether the attribute of a port is the diagnostic port, the modem port, or the AT (Attention) port, and so on, according to the port description information.

Since the processing methods of the systems are different, the Linux system has no similar port processing mechanism of the Windows system, and the device port identification methods of the Windows system cannot work properly in the Linux system. That is why the data card device port identification method for the Linux system, namely, how to make the software at the PC side in the Linux system correctly identify the data card device, and to correctly distinguish the AT command control port and the Modem data port, came into being.

SUMMARY OF THE INVENTION

The technical problem to be solved in the present invention is: to provide a method for identifying device ports of a data card in the Linux system so as to accurately determine the attributes of each port of the device.

In the present invention, the following technical solution is applied:

a method for identifying device ports of a data card in a Linux system, comprising:

acquiring information of a universal serial bus (USB) device, recording device information of the USB device to be identified in said acquired information;

acquiring port information of ports of the USB device to be identified according to the device information of the USB device to be identified; and identifying the attributes of the ports according to said port information.

the step of acquiring information of the USB device comprises: calling library functions related to the USB device in the system to acquire the information of the USB device.

the step of calling the library functions related to the USB device in the system to acquire the information of the USB device comprises: after initializing the USB device by calling the library functions related to the initialization, calling library functions related to information acquisition to acquire the information of the USB device.

Before acquiring the port information of each port of the USB device to be identified, the aforementioned method also comprises: if the USB device to be identified is a virtual CD-ROM device, switching the USB device to be identified to a normal USB device.

Said step of identifying the attributes of a port according to the port information comprises: searching out two ports that respond to the AT command from all the ports according to the port information, and identifying the attributes of the two ports that respond to the AT command according to the preset order attribute of the AT port and the Modem port.

The device information comprises a vendor ID and a product ID.

The port information comprises a port name and a port device file path.

The present invention also provides an apparatus for identifying device ports of a data card in a Linux system, comprising: a device information acquisition module, a port information acquisition module and a port identification module;

the device information acquisition module is set to: acquire device information of a USB device to be identified;

the port information acquisition module is set to: acquire port information of all the ports of the USB device to be identified according to the device information of the USB device to be identified;

the port attribute identification module is set to: acquire the attributes of all the ports according to said port information.

The device information comprises a vendor ID and a product ID.

The port information comprises a port name and a port device file path.

The beneficial effects of the present invention are: by acquiring the device information and the port information, and according to the feature that the AT port and the Modem port can send and receive AT commands correctly, the AT port and the Modem port can be identified accurately, so that the attributes of each port of the device can be determined accurately, and the device ports of the data card can be identified even if there is no port description mechanism in the Linux operating system.

PREFERRED EMBODIMENTS OF THE PRESENT INVENTION

In the following, the present invention will be described in further detail in combination with the accompanying drawings and specific embodiments.

Figure 1:
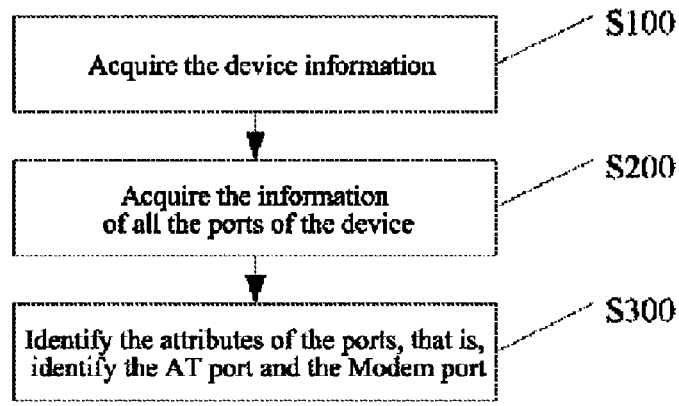
FIG. 1 is a flow chart of a method in accordance with the embodiment of the present invention.

An embodiment of the present invention provides a method for identifying device ports of a data card in a Linux system, as shown in FIG. 1, by implementing the following steps S100 to S300, the attributes of each port of the device can be accurately determined.

In step S100, the invention acquires the device information, that is, acquires the information of the USB device and records the device information of the USB device to be identified;

in step S200, the invention acquires the port information of all the ports of the USB device to be identified according to the device information of the USB device to be identified; and in step S300, the invention acquires the attributes of all the ports according to said port information, that is, identifies the AT port and the Modem port.

For the step S100, in order to obtain the device information, the device should be first identified to acquire the Vendor ID (VID) and the PID. In this embodiment, the USB device information on the D-Bus is acquired by calling the library functions related to the USB device in the system via the application program; the format of the USB device information returned by the system is: "VID: PID", for example, the system returns the information of three devices: Device 1: lbd2: 0001; Device 2: lbd2: 0002; Device 3: 19d2: 0031. Therefore, for the Device 1, VID=lbd2 and PID=0001; for the Device 2, VID=lbd2 and PID=0002; and for the Device 3, VID=19d2 and PID=0031. Wherein, when VID=19d2, it is the device which should be identified by the application program, the application program records the device information VID=19d2 and PID=0031 of the Device3 and leaves it to be further processed.

Figure 2:
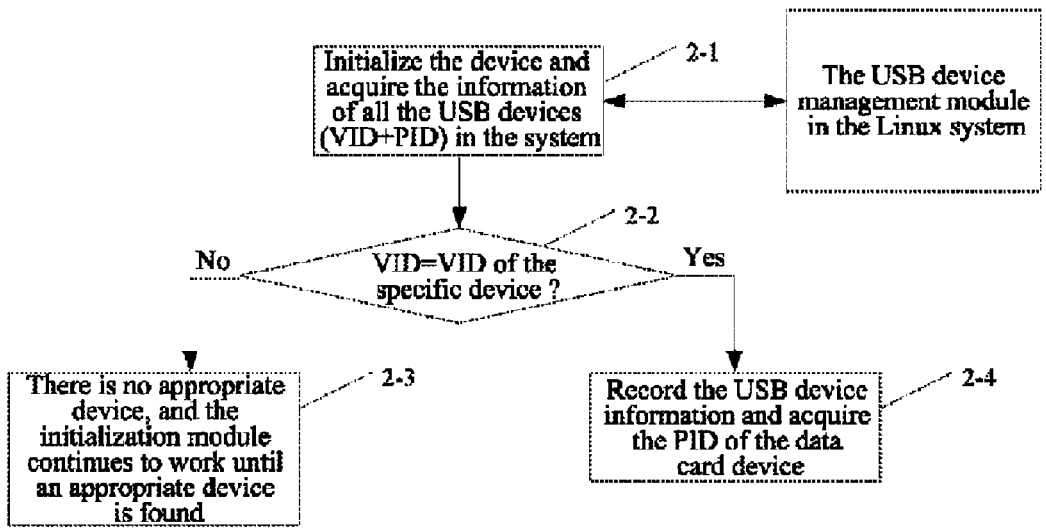
FIG. 2 is a flow chart of acquiring device information of the data card in the embodiment shown in FIG. 1.

The process of acquiring the PID of the data card device specifically comprises the following steps 2-1 to 2-4, as shown in FIG. 2.

Step 2-1: the device port is initialized and the information of all the USB devices in the system is acquired. The device is initialized by calling the functions usb-init( ), usb-find-busses( ) and usb-find-devices( ), and the USB device information on the D-Bus is acquired through the function usb-get-busses( ). The information of the USB device to be acquired in this embodiment is very simple, and only the device's VID and PID are needed, wherein, the VID represents the device manufacturer, while the PID represents a device from the manufacturer.

Step 2-2: judge whether the VID is a VID of the specified device or not. The application program typically only identifies a device with the specified VID value, and of course, this value is configurable. If the VID is a VID value of the specified device, it is to proceed to step 2-4; otherwise it is to proceed to step 2-3;

In step 2-3, there is no appropriate device, that is, the device that should be processed has not been inserted, the initialization module continues to work until an appropriate device is found.

Steps 2-4: record the USB device information, and acquire the PID of the data card device.

At this point the process of acquiring the PID of the device ends.

Figure 3:
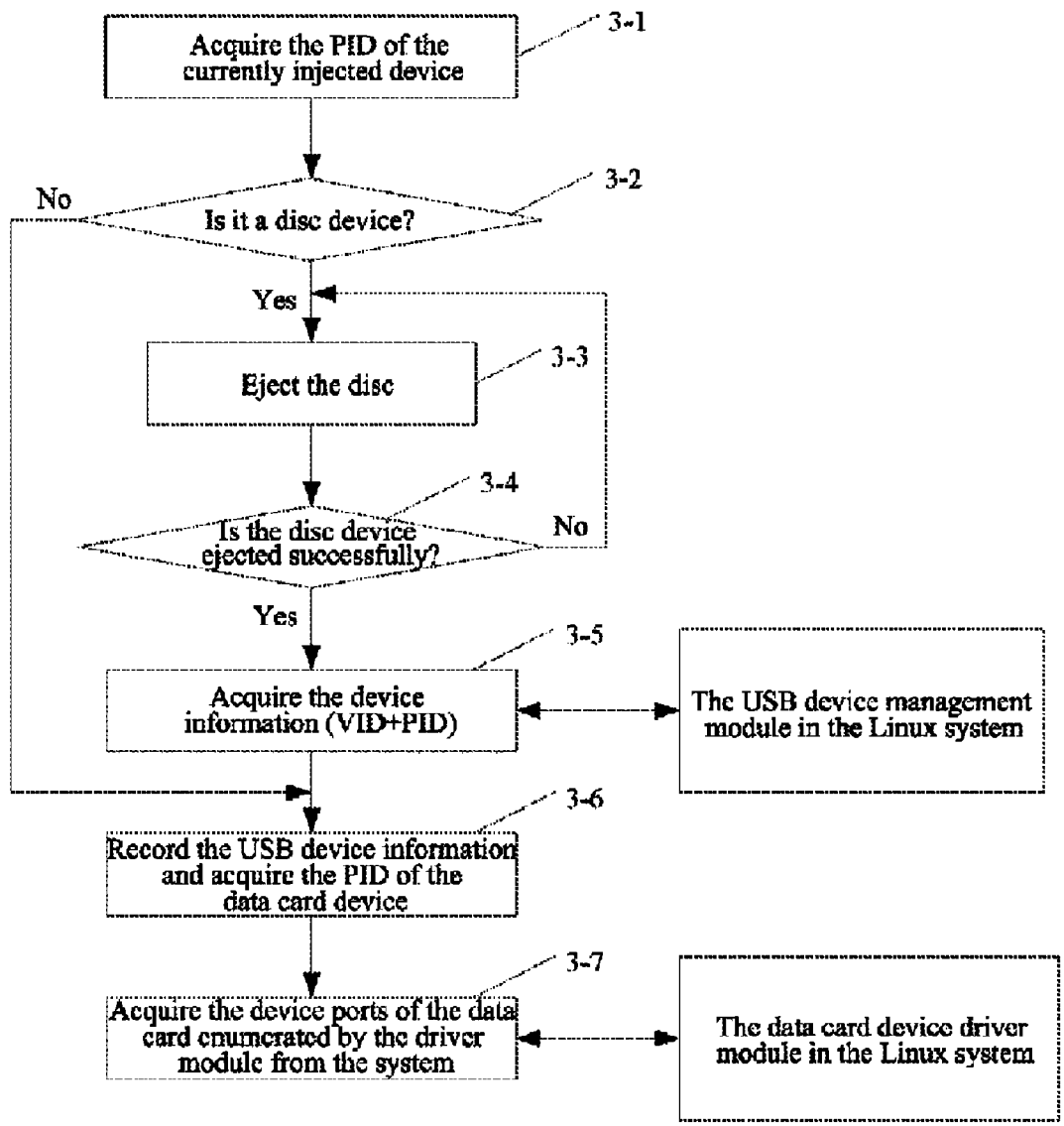
FIG. 3 is a flow chart of acquiring port information of the device in the embodiment shown in FIG. 1.

It is to proceed to step S200 after implementing the step S100 of acquiring the device information, to acquire all the ports of the device by enumerating the device ports. First, it is to judge whether the device is a virtual CD-ROM device or not, if yes, it is to eject the disc first, and switch the virtual CD-ROM device into a normal USB port device. According to the VID of the device, it is to judge whether the USB device is a device supported by the application program or not, if yes, it is to acquire the port information from the system, otherwise, it is no further processing. The specific steps are described in FIG. 3, comprising the steps 3-1 to 3-7:

step 3-1: acquire the PID value of the currently injected device, and the acquisition method can refer to the aforementioned step S100;

step 3-2: judge whether the identified device is a virtual CD-ROM device or not according to the PID value; if it is a virtual CD-ROM device, the disc device should be ejected first, and the device is switched to a common USB device, i.e. it is to proceed to step 3-3; otherwise it is to proceed to step 3-6;

step 3-3: eject the disc device, the command used in this embodiment is "eject MODEMCONNECTION";

step 3-4: judge whether the disc is ejected successfully or not, if yes, it is to proceed to step 3-5; otherwise it is to proceed to step 3-3;

at step 3-5, after the disc is ejected, the PID will automatically be switched to a PID of the port device, and it is to obtain the PID and VID information of the device through the USB device management module;

step 3-6: record the USB device information, and acquire the PID value of the data card device;

step 3-7: acquire the data card device ports enumerated by the driver module from the system, the device driver module will enumerate all the ports of the device. The port information typically comprises the port name and the port device file path, the Linux system typically puts the port device file under the directory of /dev, and the device port name is usually ttyUSB* (or ttyACM*, wherein * represents a number between 0-n), that is, the enumerated ports are ttyUSB0, ttyUSB1, ttyUSB2, ... , ttyUSBn (or ttyACM*, where * is a number between 0-n). The application program might support the port devices via the configuration and support the ttyUSB* by default. The port name is related to the specific device. All the devices in the Linux system are managed in the form of files, each device is an I/O file, an operation on the device is to operate, such as read and write, query, delete, and so on, these files. The complete file path of the device ports enumerated by the driver module is /dev/ttyUSB* or /dev/ttyACM*, and the operation by the application program on the device port is an operation on the I/O.

Figure 4:
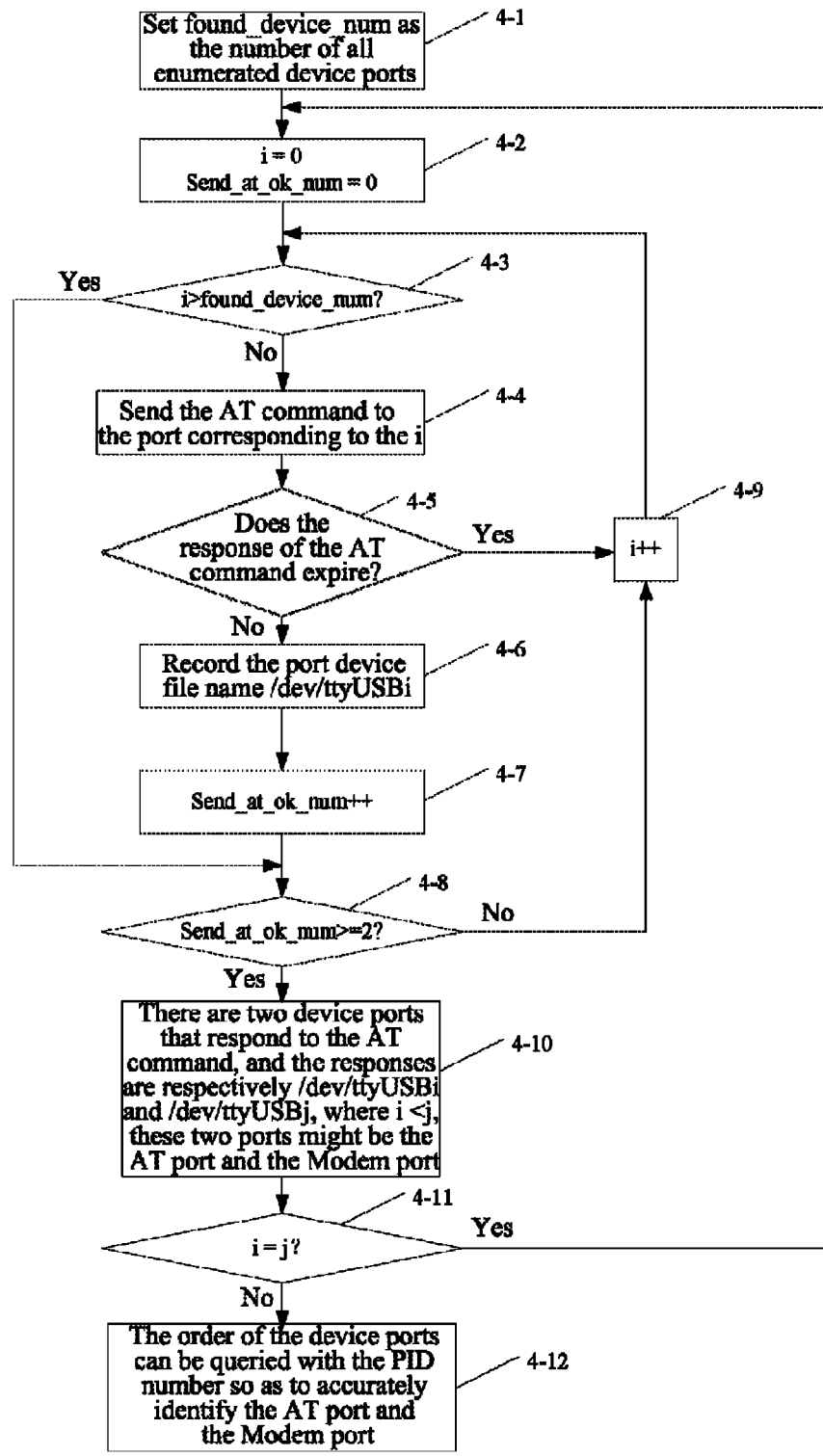
FIG. 4 is a flow chart of identifying the attributes of the ports in the embodiment shown in FIG. 1.

After acquiring the information of all the ports of the device, it is to implement the step S300 of identifying the AT port and the Modem port. In the present embodiment, according to the feature that both the AT port and the Modem port can send and receive AT commands, by the response state of the ports, as well as the preset order attribute of the AT port and the Modem port, the AT port and the Modem port can be correctly identified. Namely, first, from all the enumerated ports, it is to search out the ports that respond to the AT commands, then it is to check the order of this device according to the device PID, and finally, to correctly identify the AT port and the Modem port. The specific steps are shown in FIG. 4, comprising steps 4-1 to 4-12.

Step 4-1: set found_device_num as the number of all enumerated device ports;

step 4-2: initialize Send-at-ok-num and i, where the Send_at_ok_num is a counter for the ports which normally send and receive AT commands, i is the cycle control counter for port processing, in this embodiment, both of them are initialized as Send_at_ok_num=0 and i=0;

step 4-3: judge whether the i is greater than the found_device_num or not; if yes, it is to proceed to step 4-8; otherwise it is to proceed to step 4-4;

step 4-4: send the AT command to the port corresponding to the i, that is, to send the AT command to the enumerated port /dev/ttyUSBi (or /dev/ttyACMi), and then to wait for a response;

step 4-5: judge whether the response of the AT command expires or not; if not, it is to proceed to step 4-6; if yes, it is to proceed to step 4-9;

at step 4-6, the port can normally respond to the AT command, this port is either an AT port or a Modem port, and the port status is normal, it is to record the port device file name /dev/ttyUSBi (or /dev/ttyACMi), and it is to proceed to step 4-7;

at step 4-7, the value of the Send_to_ok_num is incremented by 1, that is, Send_to_ok_num=Send_to_ok_num+1, which means that a port which sends and receives the AT command normally is found, it is to proceed to step 4-8;

step 4-8: judge whether the Send_at_ok_num is greater than or equal to 2 or not; if yes, it is to proceed to step 4-10; otherwise it is to proceed to step 4-9;

at step 4-9, the value of i is incremented by 1, which indicates continuing to detect the next enumerated device port, it is to proceed to the step 4-3;

at step 4-10, there are two device ports that respond to the AT command, and the responses are respectively /dev/ttyUSBi and /dev/ttyUSBj, where i<j, these two ports might be the AT port and the Modem port, and it is to proceed to step 4-11;

step 4-11: judge whether i=j or not, if yes, it is indicated that only one port can normally process the AT command, the port identification fails, it is to proceed to step 4-2; otherwise it is to proceed to step 4-12;

at step 4-12, the device port identification is successful. The order of the device ports can be queried with the PID number, so as to accurately identify the AT port and the Modem port. That is, firstly, it is to query whether the device is a positively ordered device or not. It is to search for the PID of the device in the Pid_Positive array, if the Pid_Positive array has the PID of this device, it indicates that the device port is positively ordered, therefore the dev/ttyUSBi is the AT port, and the /dev/ttyUSBj is the Modem port. If the Pid_Positive array does not have the PID of this device, it is to search for the PID of the device in the Pid_NePositive array, if this PID is found, it means that the device port is reversely ordered, therefore the dev/ttyUSBi is the Modem port and the /dev/ttyUSBj is the AT port, the port identification ends. However, if the PID of the device is found neither in the Pid_Positive array nor in the Pid_NePositive array, the device is considered as a positively ordered device by default, the AT port is in the front of the Modem port. This case often occurs when a new device is introduced but the device port order data table is not updated timely.

Figures 5, 5A, 5B:
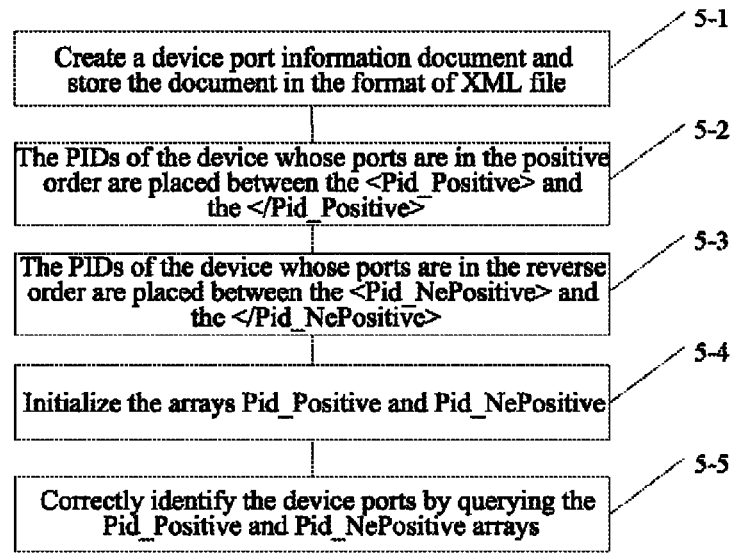
FIG. 5 is a flow chart of a method of presetting the order attributes of the ports in accordance with the embodiment of the present invention.
FIG. 5A is a diagram of the XML format in the embodiment shown in FIG. 5.
FIG. 5B is a schematic diagram of the port information array in the embodiment shown in FIG. 5.

The orders of the AT port and the Modem port should be set in advance in the aforementioned step S300, the method of the present invention sets the orders of the ports by manually creating an order table, the example for this is shown in FIG. 5, the other advantage of manually creating the port order table is: when a new device is added, it can be quickly configured in the table so that the device port can be successfully identified. As shown in FIG. 5, it comprises steps 5-1 to 5-5:

step 5-1: it is to create a device port information document, and store the document in the format of Extensible Markup Language (XML) file, the basic format of the content is shown in FIG. 5A. The number of devices which can be supported by the XML is related to the array length defined by the application program, and in this embodiment, its default value is set as 200. In addition, in this embodiment, the application program only needs to understand the sort order of the AT port and the Modem port of a device, either the AT port is in the front of the Modem port (which is called a positive order in this context,), or the AT port is after the Modem port (which is called a reverse order in the context); therefore, the table is divided into two parts, which are used to respectively fill in the positively ordered devices and the reversely ordered devices.

at step 5-2, the PIDs of the device whose ports are in the positive order, such as 0x01, 0x02 0x108, and so on, are placed between the <Pid_Positive> and the </Pid_Positive>, when the aforementioned array length is 200, the PIDs of 200 devices at most can be filled in.

at step 5-3, the PIDs of the device whose ports are in the reverse order, such as 0x018, . . . , 0x57, 0x94, and so on, are placed between the <Pid_NePositive> and the </Pid_NePositive>, when the aforementioned array length is 200, the PIDs of 200 devices at most can be filled in.

step 5-4: initialize the port information arrays Pid_Positive and Pid_NePositive. Both the Pid_Positive and the Pid_NePositive are arrays of the int type, the array length in this embodiment is 200 (the length is extendable in other embodiments), which means 200 positively ordered devices and 200 reversely ordered devices can be supported at the same time, as shown in FIG. 5B, the content in each unit of the array is the device PID. The port order data is read from the XML file to the array, the positively ordered data is stored in the Pid_Positive array, and the reversely ordered data is stored in the Pid_NePositive array. The method for using these two arrays is as follows:

if the Pid_Positive [i]=0x31, it indicates that the AT port and the Modem port of the device with PID=0x31 are positively ordered, that is, the AT port is in the front of the Modem port, the device is the $i^{th}$ positively ordered device which can be supported by the application program. Similarly, if the Pid_NePositive [j]=−0x108, it indicates that the AT port and the Modem port of the device with PID=0x108 are arranged in reverse order, that is the AT port is after the Modem port, the device is the $j^{th}$ reversely ordered device that can be supported by the application program;

at step 5-5, after the initializations of the Pid-Positive and Pid-NePositive arrays are complete, the application program can normally use these two arrays. The common operation is to correctly identify the AT port and the Modem port finally by querying the orders of the ports according to the PID values.

In the following, an embodiment of an apparatus for identifying the device ports of a data card in the Linux system is provided to perform the aforementioned port identification method, and the device comprises a information acquisition module, a port information acquisition module, and a port identification module; wherein, the device information acquisition module is used to acquire the device information of the USB device to be identified, the port information acquisition module is used to acquire the port information of all the ports of the USB deice to be identified according to the device information of the USB device to be identified, the port attributes identification module is used to acquire the attributes of all the ports of the USB device to be identified. The processes of the device information acquisition module specifically acquiring the device information, the port information acquisition module specifically acquiring the port information, as well as the port attribute identification module specifically identifying the attributes of the ports can refer to the aforementioned method embodiment and are not repeated here.

The above content is a further detailed description of the present invention in combination with the specific embodiments, but the specific implementation of the present invention cannot be considered as only being limited to this description. For those skilled in the field of the present invention, without departing from the concept of the present invention, a number of simple deductions or replacements can be also made, and all these simple deductions and replacements should be considered as belonging to the protection scope of the present invention.

Those skilled in the field can understand that all or part of the steps in the aforementioned method can be completed by instructing related hardware with the program, said program can be stored in a computer readable storage medium, such as read-only memory, disk, or CD-ROM. Optionally, all or part of the steps of the aforementioned embodiment can be implemented with one or more integrated circuits. Accordingly, each module/unit in the aforementioned embodiment can be implemented in the form of hardware or software modules. The present invention is not limited to any particular form of hardware and software combination.

INDUSTRIAL APPLICABILITY

In the present invention, by acquiring the device information and the port information, and according to the feature that the AT port and the Modem port can send and receive AT commands, the AT port and the Modem port can be identified accurately, thus the attributes of each port of the device can be determined accurately, and the device ports of the data card can be identified even if there is no port description mechanism in the Linux operating system.

What is claimed is:

1. A method for identifying device ports of a data card in a Linux system, comprising:
    acquiring information of a universal serial bus (USB) device, recording device information of the USB device to be identified in the acquired information;
    acquiring port information of ports of the USB device to be identified according to the device information of the USB device to be identified; and
    searching out two ports that respond to an attention (AT) command from all the ports according to the port information;
    after device ports identification is successful, searching for a product identity, PID, of the USB device in a Pid_Positive array, if the Pid_Positive array has the PID of the USB device, indicating that the device ports are positively ordered, therefore an AT port and a Modem port being accurately identified; if the Pid_Positive array does not have the PID of the USB device, searching for the PID of the USB device in a Pid_NePositive array, if the PID is found, indicating that the device ports are reversely ordered, therefore the AT port and the Modem port being accurately identified; if the PID of the USB device is found neither in the Pid_Positive array nor in the Pid_NePositive array, considering the USB device as a positively ordered device by default, therefore the AT port and the Modem port being accurately identified.

2. The method of claim 1, wherein the step of acquiring the information of the USB device comprises: calling library functions related to the USB device in the system to acquire the information of the USB device.

3. The method of claim 2, wherein the step of calling the library functions related to the USB device in the system to acquire the information of the USB device comprises: after initializing the USB device by calling the library functions related to the initialization, calling library functions related to information acquisition to acquire the information of the USB device.

4. The method of claim 1, wherein before the step of acquiring the port information of the port of the USB device to be identified, the method also comprises: if the USB device to be identified is a virtual CD-ROM device, switching the USB device to be identified to a normal USB device.

5. The method of claim 1, wherein the device information comprises a vendor identity, VID and the PID.

6. The method of claim 1, wherein the port information comprises a port name and a port device file path.

7. An apparatus for identifying device ports of a data card in a Linux system, comprising at least one processor executing a device information acquisition module, a port information acquisition module and a port identification module; wherein
    the device information acquisition module is set to: acquire device information of a USB device to be identified;
    the port information acquisition module is set to: acquire port information of all the ports of the USB device to be identified according to the device information of the USB device to be identified;
    the port attribute identification module is set to: search out two ports that respond to an attention (AT) command from all the ports according to the port information; after device ports identification is successful, search for a product identity, PID, of the USB device in a Pid_Positive array, if the Pid_Positive array has the PID of the USB device, indicate that the device ports are positively ordered, therefore accurately identify an AT port and a Modem port; if the Pid_Positive array does not have the PID of the USB device, search for the PID of the USB device in a Pid_NePositive array, if the PID is found, indicate that the device ports are reversely ordered, therefore accurately identify the AT port and the Modem port; if the PID of the USB device is found neither in the Pid_Positive array nor in the Pid_NePositive array, consider the USB device as a positively ordered device by default, therefore accurately identify the AT port and the Modem port.

8. The apparatus of claim 7, wherein the device information comprises a vendor ID and a product ID.

9. The apparatus of claim 7, wherein the port information comprises a port name and a port device file path.

10. The method of claim 2, wherein the device information comprises a vendor identity, VID, and the PID.

11. The method of claim 3, wherein the device information comprises a vendor identity, VID, and the PID.

12. The method of claim 4, wherein the device information comprises a vendor identity, VID, and the PID.

13. The method of claim 2, wherein the port information comprises a port name and a port device file path.

14. The method of claim 3, wherein the port information comprises a port name and a port device file path.

15. The method of claim 4, wherein the port information comprises a port name and a port device file path.

16. The apparatus of claim 8, wherein the port information comprises a port name and a port device file path.

* * * * *